United States Patent Office 3,532,602
Patented Oct. 6, 1970

3,532,602
PROCESS FOR REDUCING VISCOSITY OF
STABILIZED STARCH SOLUTIONS
Martin Seidman, Decatur, Ill., assignor to A. E. Staley Manufacturing Company, Decatur, Ill., a corporation of Delaware
No Drawing. Filed July 17, 1967, Ser. No. 653,620
Int. Cl. C13l 1/00
U.S. Cl. 195—31                                    9 Claims

ABSTRACT OF THE DISCLOSURE

Method for reducing the viscosity of a stabilized solution of starch by contacting said solution with a material exhibiting pullulanase activity. Method having special applicability for separating amylose from stabilized starch solutions.

---

This invention relates to a method for reducing the viscosity of a stabilized starch solution to facilitate the formation and separation of a solid starch fraction. More particularly this invention is directed to an improved method for separating amylose and amylopectin from starch.

Ordinary starch is known to consist of two types of polymers of glucose, the linear polymer called amylose (sometimes referred to as the "A-fraction"), and the branch-chain polymer called amylopectin (sometimes referred to as the "B-fraction"). The relative content of amylose and amylopectin varies with the source of the starch. For example, depending somewhat on the analytical technique used, it has been estimated that tapioca contains about 17–21% amylose; potato starch, 22–25%; corn starch, 22–30%; and so on. The amylose molecule is considered to be a long, linear chain of anhydroglucose units. The amylopectin molecule, on the other hand, is considered to be a larger, complex branched chain of tree-like structure with many of the branches themselves having branches, and so on.

The two fractions have substantially different properties. According to Kerr, Chemistry and Industry of Starch, Academic Press (1950), the amylose molecule is of low molecular weight as compared to the amylopectin molecule (a few hundred anhydroglucose units with only one non-reducing end group per molecule). On the other hand, amylopectin is a high molecular weight molecule (more than 1,000 anhydroglucose units with one non-reducing end group for each 20 to 30 glucose residues). Amylose has a high intrinsic viscosity and a low solution stability in water at ordinary concentration, while amylopectin has a fairly high solution stability but about the same intrinsic viscosity.

Relatively recently, several different approaches have been taken with the view of producing the individual fractions. One approach has been the genetic development of waxy maize whose starch consists essentially of amylopectin. Currently, there is a major program underway to breed varieties of corn whose starch is high in amylose. Further, over the last twenty years, a substantial number of patents have issued on methods for the separation of the two fractions.

None of the methods used to produce the separate starch fractions has proved really successful in an economic sense and each has its drawbacks. The amylopectin derived from waxy maize corn is expensive because of the care required in growing and processing this hybrid variety. The genetic program to breed corn whose starch consists essentially of amylose has met with some success, as a mutant has been found that has of the order of twice to three times the amylose content of normal corn. However, the present costs for growing and processing such hybrids are high. On the other hand, the chemical methods of separation are based on the formation of a chemical complex of the fractions, particularly of the amylose, or on a fractional salting-out process which may also employ a complexing agent. For example, in one method, an alkaline earth hydroxide complex is used; in another, an alkyl alcohol complex (pentanol or butanol for example) is produced; and in another, solutions of certain inorganic sulfates are used in a kind of fractional crystallization. In another method, described in patent applications S.N. 355,-420 and 375,016, filed Mar. 25, 1964, now U.S. Pat. 3,313,654, and May 29, 1964, now U.S. Pat. 3,323,949 respectively, carbon tetrachloride was employed to facilitate the precipitation of the amylose fraction of strach by complexing the carbon tetrachloride with the amylose and thereafter removing the carbon tetrachloride by a series of controlled heating steps. All of these chemical methods are less attractive because of the problems created in recovering, separating, or disposing of the reagents used.

Still another process for fractionating starch from an aqueous suspension can be found in U.S. Pat. 3,067,067 to Wagoner et al.

Stated briefly the above patent discloses a process whereby a mixture of starch and water is heated to a temperature above 120° C. to provide a fluid solution of starch in water. The starch solution is then carefully cooled to and maintained at a temperature above 49° C. to provide a stabilized, non-congealing starch solution from which a solid fraction of starch is precipitated. The precipitated solid starch fraction is then separated from the fluid fraction in any suitable manner. For example, a high speed centrifuge of the type employed in corn starch wet milling for separating the granular starch from the crude may be used.

Although the Wagoner et al. process is a novel and economical method for obtaining high purity amylose and amylopectin, the above process, however, does possess certain operational limitations. One of such limitations is that it is necessary for the fractionation process to be conducted (if high purity amylose and amylopectin are desired) on starch solutions having a starch concentration which imparts to the solution a viscosity of less than 1,500 centipoises. With solutions of native corn starch, for example, viscosities of greater than 1,500 centipoises at about 25° C. can be easily attained at concentrations approaching 15% solids by weight dry substance (d.s.). Depending on the variety of starch being used, the rate of heating, the final temperature of the solution, the manner in which the starch solution has been treated, etc., it is not uncommon at all for a solution having 10% by weight d.s. solids to have a viscosity of 4,000 centipoises or even higher at temperatures of about 25° C. Although a viscosity upper limit of about 1,500 centipoises is placed on solutions which may be used in the Wagoner et al. process, the process is preferably conducted at viscosities of between 400–600 cps. This means that the concentration of the solution will be below 10% by weight d.s. In instances where the viscosity of the solution is above that which is preferred for obtaining high purity amylose and amylopectin fractions, Wagoner et al. recommend that the starch solution be diluted with water to reduce the solution's viscosity prior to or during the separation step. Diluting the starch solution with water effectively reduces the solution's viscosity; however, this additional water also reduces the concentration of starch in the solution and increases the cost for obtaining the starch fractions since this additional water must eventually be removed.

Other means for reducing the viscosity of a starch solution such as by the use of "thinning enzymes" or by the use of mineral acids have also been unsatisfactory, the reason being that thinning enzymes and mineral acids are nonselective hydrolyzing agents, and during the thinning process hydrolyze amylose as well as amylopectin. This nonselective hydrolysis therefore precludes the formation and separation of a high molecular weight amylose fraction from a starch solution.

It is therefore a primary object of this invention to provide a method for reducing the viscosity of a stabilized starch solution to facilitate the formation and separation of high molecular weight amylose.

Another object of this invention is to provide a more efficient method for separating amylose from a stabilized, more highly concentrated, starch solution.

A further object of this invention is to provide an improved method for fractionating amylose and amylopectin from an aqueous starch solution, which overcomes the limitations presently found in starch fractionation processes.

Briefly stated, these and other objects of this invention are attained by contacting a stablized, high viscosity, fluid aqueous solution of starch which is capable of forming and growing separable solid fractions rich in high molecular weight amylose with a material exhibiting pullulanase activity for a period sufficient to reduce the solution's viscosity to a viscosity which will facilitate and accelerate the formation and separation of the solid starch fraction without requiring the addition of a diluting liquid and thereafter separating a solid fraction enriched in amylose and a fluid fraction enriched in amylopectin.

High molecular weight amylose is defined as that fraction of amylose having an average molecular weight of greater than 75,000. Depending on the source of amylose (corn, potato, etc.), the average molecular weight can vary from between about 75,000 and 200,000. Low molecular amylose, that is amylose having an average molecular weight of below 75,000, can be obtained, for example, by the action of amylo-1,6-glucosidase on amylopectin. This low molecular weight amylose can have a molecular weight varying from as low as 3,000 to as high as 75,000.

Any enzyme capable of selectively hydrolyzing alpha-1,6-glucosidic bonds of starch may be used in the process of this invention. Such enzyme is referred to herein as an enzyme (enzyme preparation) exhibiting pullulanase activity. The enzyme referred to in the literature as "pullulanase" is preferred because of its alpha-1,6-glucosidic specificity. According to the literature this enzyme was first reported by Bender & Wallenfels in Biochemische Zeitschrift, vol. 334, pages 79–95 (1961), and was used by these authors in the study of the structure of glycogen and amylopectin. Still other more recent publications covering the use and production of this enzyme can be found in Cereal Chemistry, vol. 43, pages 658–669 (1966), and in Methods of Enzymology, vol. 8, pages 555–559 (1966). According to the above references, pullulanase can be readily obtained from the organism *Aerobacter aerogenes*. However certain strains of *Aerobacter aerogenes* have been reported to produce significantly higher amounts of this enzyme. For example, *Aerobacter aerogenes* (U–58), which is reported to be a direct descendant of the original strain isolated by Bender and Wallenfels has been found to be a particularly good source of this enzyme. Various ultraviolet induced mutants of *Aerobacter aerogenes* (U–58) can also be used. Other reported strains of *Aerobacter aerogenes* which can be used include *Aerobacter aerogenes* ATCC9621 and ATCC 15050.

It has been found that high molecular weight amylose can be obtained if the pullulanase which is introduced into the stabilized starch solution is purified and is substantially free of other competing amylases, alpha-, beta- and glucoamylases, transglucosidase, etc.

Pullulanase can be obtained from the organism *Aerobacter aerogenes* by the process described in the Bender and Wallenfels publication previously referred to. If desired, the crude preparation can then be purified prior to use; however, the utility of the enzyme in the process of this invention is not restricted to preparations of any specific purity. Obviously, though, the use of a high purity enzyme is preferred.

Maximum efficiency of the pullulanase is obtained when the enzyme is added ot a stabilized starch solution which is maintained at a temperature of between 30° and 50° C. and a pH of between about 6.5 and 7.5. Useful results, however, can be obtained when the enzyme is added to starch solutions outside of these ranges such as at a temperature of between 20° C. and 70° C. and a pH of between 5.0 and 8.0, but at greater expense and lesser efficiency. Generally, stated, the enzyme is preferably added to a starch solution maintained at conditions which are optimum for hydrolyzing alpha-1,6-glucosidic bonds.

The amount of enzyme added to the starch solution is not particularly critical and depends to a large degree on the initial viscosity of the starch solution, the desired degree and rate at which the viscosity of the solution is to be reduced, the activity of the enzyme, the concentration of the starch solution, reaction conditions, the average molecular weight of amylose desired, etc. Generally the amount of enzyme used is that amount which will effectively reduce the solution's viscosity to a viscosity of less than 1,500 centipoises in less than 24 hours and preferably in less than 12 hours. Generally the average molecular weight of amylose will be lowered if the amount of pullulanase activity is increased or if the contact time of the enzyme with the amylose is increased (other conditions being held constant).

Since the viscosity of the starch solution affects, to some degree, the rate of growth of the solid particles in the solution, the pullulanase activity can be introduced into the starch solution as the solution is being stabilized. Preferably, though, the enzyme is added after the starch solution has been substantially stabilized and has been cooled to a temperature which will not deactivate or adversely affect the activity of the enzyme. For pullulanase obtained from strains of *Aerobacter aerogenes* (U–58), this deactivation temperature is generally below 70° C. Temperatures above 70°–80° C. are generally to be avoided, as the pullulanase is deactivated almost immediately at these higher temperatures.

As was previously stated, the enzyme exhibiting pullulanase activity is added to the stabilized starch solution for the purpose of reducing the viscosity of the starch solution to a viscosity which will facilitate the precipitation and separation of a solid starch fraction, this reduction in viscosity being accomplished without the need of diluting, and thereby reducing, the concentration of the starch solution. Since the viscosity of a starch solution can now be controlled by the use of an enzyme exhibiting pullulanase activity, the solution's starch concentration is not especially critical to the practice of this invention and can be varied over a broad range. In certain instances, concentrations of starch as high as 35–40% by weight d.s. (dry substances) and as low as 2.5% d.s. can be used. (Concentrations of 35–40% d.s. correspond to starch solutions having a Baumé of about 21–23.°) However, because of economic and process limitations starch concentrations of between 10% and 20% weight d.s. are generally used. Although the concentration of the starch solution which may be used may be varied over a broad range, the viscosity of the starch solution is preferably maintained (by action of the enzyme exhibiting pullulanase activity at a viscosity of between 400–600 centipoises. However, if a high speed centrifuge is employed for the separation of the solid fraction from the starch solution, the viscosity of the solution can be as high as 1,500 centipoises.

The viscosity measurements which are referred to herein were determined on starch solutions at a temperature of 25°–30° C. using a Brookfield viscometer at a spindle speed of 20 r.p.m. A Number 1 spindle was used for viscosities up to 500 centipoises, and a Number 2 spindle was used for viscosities over 500 centipoises. The Brookfield viscometer and its use are more fully described on page 127 of the Kerr volume cited above.

The stabilized solution employed in the process of this invention is preferably obtained by the method described in U.S. Pat. 3,067,067 to Wagoner et al. However, other methods for obtaining a stabilized starch solution can be used if desired.

According to the Wagoner et al. patent, a suspension of starch, prepared by mixing dry starch with water, is heated to a temperature above 120° C. for a time sufficient to transform the starch suspension into a fluid, mobile, and usually quite clear liquid. This transformation to a "fluid solution" is important, as no separation of the starch fractions can be achieved unless this transformation occurs.

Preferably the starch suspension is taken to a temperature of greater than 120° C. as rapidly as possible. To achieve this desirable end, an apparatus of the type disclosed in U.S. Pat. No. 3,101,284 to O. R. Etheridge is preferably used. In this apparatus, steam at superatmospheric pressure is continuously mixed with the starch suspension in the throat of a steam jet. In this way, the suspension is brought to the desired temperature virtually instantaneously and the starch is cooked to a fluid solution within a few seconds. In the apparatus of the U.S. patent referred to, the steam-heated suspension flows downward into and through a detention zone where the hot suspension is maintained at an elevated temperature for a period of time that is selectable. This apparatus is so arranged and constructed that there is substantially no mixing in the detention zone in order that the starch solution withdrawn from the bottom of the detention zone be maintained at a uniform temperature for a uniform length of time. Other forms of this type of apparatus may also be used for heating, for example, of the types disclosed in U.S. Pat. Nos. 2,871,146; 2,582,198; and 2,805,966.

Other methods may be used for heating the starch-and-water mixture. For example, a starch-water mixture can be heated in an autoclave or heated indirectly by pumping through a heat exchanger comprising a coil of tubing in a constant-temperature environment or other arrangement and similar results obtained.

It is desirable to agitate the starch suspension when bringing it up to temperature in order to assure uniform heating and rapid heat transfer. This is readily accomplished in the steam-jet type of apparatus already described.

The final temperature above 120° C. to which the solution is heated and the time at this temperature both have an influence on the results obtained. Within limits, relatively high temperatures and short times appear to have an advantageous effect on the viscosity and stability of the solution after cooling, and on the ease of separation of the starch fractions. Nevertheless, the higher the temperature or the longer the time at temperature, the greater is the tendency for the starch to become degraded, i.e., to be of lower molecular weight. At the minimum, the starch solution must be kept above 120° C. until all the starch is acted upon uniformly. Then as the temperature is increased or the time above 120° C. is increased, the other should be decreased. As a compromise between ease of separation and solution stability on one hand, and molecular weight of the fractions on the other, temperatures in the range of 120° C. to 177° C. can be used when the suspension is heated to temperature in less than five minutes and held at temperature for up to about 30 minutes additional. Optimum results have been obtained by heating the starch and water to a temperature of 138° to 160° C. substantially instantaneously in a continuous manner and holding at temperature for 0.5 to 15 minutes. Temperatures in excess of about 177° C. should be avoided, because at this point degradation is too rapid; but this temperature limit will vary 5 or 15° C., depending on the variety of starch being used.

In the first stage of cooling from above about 120° C., the solution may be cooled at any suitable rate to the atmospheric boiling point. It is preferably cooled rapidly to the atmospheric boiling point as by flashing the solution to atmospheric pressure when the Etheridge apparatus is used, or by quenching. While slow cooling to the atmospheric boiling point is possible, as by permitting the temperature of the solution and the apparatus containing it to decrease without forced cooling, this is preferably avoided to avoid degrading or hydrolyzing the starch. Rapid cooling to the boiling point of the solution produces amylose of higher molecular weight and this is preferred.

The second part of the cooling cycle is critical. In order to stabilize the solution and to form and grow amylose particles, the solution must be kept for a period between 49° C. and the atmospheric boiling point. Preferably it is cooled slowly between those temperatures.

The rate of cooling, however, may be varied depending on the type of starch being separated. There are two principal classes of starches—the root or tuber starch and the cereal starch. Each works quite differently in this phase of the process. For example, the root starches exemplified by tapioca and potato starch do not congeal as rapidly as the cereal starches, and thus a solution of tuber starches may be cooled from its boiling point temperature to room temperature in, for example, 1.5 hours. In contrast, the cereal starches exemplified by corn, rice, and wheat starches are prone to set back or gel if cooled as rapidly as was done with the tuber starches. If congealing of a cereal starch is to be prevented, it should be cooled at a gradual rate over a period not less than 8 hours from above the boiling point temperature to a temperature of below about 49° C. Depending on the size of amylose crystals desired, or the desired purity of the starch fractions, the rates of cooling, holding times, separation temperatures, etc. can be varied somewhat. Additional information relating to the above method for stabilizing a starch solution can be found in columns 3–7 of U.S. Pat. No. 3,067,067 to Wagoner et al.

When a stabilized solution is obtained, it is evidenced by the fact that it can be cooled to room temperature and will not congeal. Further, the viscosity characteristic of the solution is stabilized to such an extent that the fluid solution may be heated and then cooled below its atmospheric boiling point without forming a starch gel. This is in contrast with a non-stabilized starch solution which in cooling suffers "set back," i.e., forms a gel. A non-stabilized starch solution is also evidenced by a substantial increase in the solution's viscosity on cooling accompanied with the formation of a starch gel. If the solution is cooled to room temperature, the gel becomes rigid and cannot be put back into solution by, for example, reheating to temperatures up to 120° C. Once a gel is formed, and this most important, the separation of amylose by the process of this invention becomes impossible.

To further determine if a stabilized solution has been obtained, the following test can be performed.

A sample of the solution is cooled rapidly with stirring in an ice bath to 30° C. or to any convenient temperature near room temperature. The viscosity is then measured immediately with the Brookfield viscometer as described. The solution is kept at a constant temperature and the viscosity measurement is repeated periodically over a period of at least five hours. If the solution is stable, there will be substantially no increase in the viscosity measurement. If it is not stable, the viscosity measurement will increase suddenly and sharply and continue to increase. If the solution is unstable, there will be at least a 25% increase in viscosity in five hours, and usually there is that much of an increase within two hours.

Any variety of starch or mixture of starches containing a substantial proportion of amylose may be used. These include, for example, amylaceous materials derived from corn, rice, wheat tapioca, sago, sorghum, potato, etc. Genetically modified corn high in amylose may also be used. Pregelatinized starches, i.e., starches which are often referred to as cold-water-swelling or cold-water-soluble, as well as uncooled pasted starches, may also be used. Slightly modified or slightly dextrinized starch, or starch that has been reacted to form a derivative with a minor amount of substitution whether before or after gelatinization, may be substituted for native starch so long as these are substantially equivalent to native starch in pasting properties. However, such starch products are more expensive; and as the extent of reaction of the starch is increased, the starch fractions are of lower purity of the yield on separation is reduced, or both.

Because cold-water-swelling or pregelatinized starch offers no advantage in this process (and is, in fact, disadvantageous when a high molecular weight product is desired) it is preferred to start with granular native starch and carry it directly through the process. In addition, slurries of ganular native starch are more easily handled. Most important, however, in using granular native starch is the fact that the molecular weight of the fractions will be at their maximum since the starch has not previously been treated in any way that might lower the molecular weight.

The separated amylose may be cast from solution as a film useful in packaging, particularly foodstuffs (e.g., as sausage casings) since the amylose is digestible by humans. The structure of amylose resembles cellulose and similarly many of its derivatives are thermoplastic. Accordingly, certain derivatives of amylose, such as the acetates, are useful in the manufacture of fibers and molded products of the nature of cellulosic products. The amylopectin fraction which remains after the amylose has been separated can be used in the manufacture of adhesives; in textile printing and finishing; in thickening and stabilizing pie fillings, salad dressings, and canned food.

The following examples are given for the purpose of illustration only and are not to be interpreted as specific limitations of this invention.

EXAMPLE 1

A 10% by weight d.s. corn starch solution was prepared by mixing 10 parts of starch in 90 parts water to form a slurry, adjusting the slurry to a pH of 6.8, and cooking the slurry at a temperature of 150° C. in a continuous autoclave for a period of about one minute. The starch solution was then stabilized by rapidly cooling the starch solution from 150° C. to 100° C. and then slowly cooling the starch solution from 100° C. to 45°–50° C. at a rate of about 1° C. per 3–4 minutes over a period of about 3 hours. This controlled rate of cooling was accomplished by placing the starch solution in an oven heated to 100° C. and then cooling the oven at a rate of about 1° C. per 3–4 minutes. The stabilized starch solution was then divided into two portions and allowed to stand for a period of 24 hours at a temperature of 45°–50° C. to continue the formation and growth of a solid starch fraction. To one of the starch portions, pullulanase preparation was added in an amount of 100 mg./1,500 ml. of 10% by weight d.s. starch slurry. The pullulanase preparation had an activity of 320 units/g. One unit of pullulanase is defined as that amount of enzyme present in 1.0 ml. of solution which, with 1% pullulan as a substrate under standard conditions of assay, raises the reducing value of the substrate in 1 hour at 45 °C. to a reducing value which is equivalent to 1 mg. of maltose. To the other starch portion no enzyme was added. The starch solution containing the enzyme was then allowed to stand at 45°–50° C. for an additional 24 hours. (The pullulanase was obtained from the organism *Aerobacter aerogenes* by the Bender and Wallenfels process described in Biochem. Z., vol. 334, pages 79–95, 1961.) The viscosities of the two starch solutions were determined prior to centrifugation. The starch solution which was treated with pullulanase had a viscosity of 265 centipoises, while the untreated starch solution had a viscosity of 1,760 centipoises.

The starch solutions were then centrifuged at various centrifuging speeds for different periods of time in a Lourdes centrifuge Model No. LCA–2, having an angle head of about 30° and a radius of about 4 inches. The degree of separation of the solid starch fraction for each of the starch portions at different centrifuging speeds was noted. The results of these observations are reported in Table I.

TABLE I

| Centrifuging speed r.p.m. | Centrifuging time, min. | Untreated starch portion | Enzyme treated starch portion |
|---|---|---|---|
| 2,000 | 10 | No appreciable separation obtained. | Fair separation. |
| 4,000 | 10 | Poor separation | Good separation. |
| 8,000 | 30 | Good separation | Excellent separation. |

Poor = Less than 30% separated.
Fair = Between 30–60% separated.
Good = Between 60–85% separated.
Excellent = Above 85% separated.

The results in Table I show that the startch solution which was treated with the enzyme required substantially lower centrifuging speeds as well as shorter centrifuging times in order to obtain a good separation of the amylose fraction. On the other hand, the starch which had not been treated with a pullulanase preparation required substantially higher centrifuging speeds and longer centrifuging times in order to separate the solid amylose fraction from the water-soluble fraction.

EXAMPLES 2–5

A stabilized corn starch solution was prepared in accordance with the procedure set forth in Example 1. The stabilized starch solution was divided into four equal portions and identified as Examples 2–5 respectively. To one of the portions, pullulanase in an amount equivalent to 100 mg. per 1,500 ml. of starch solution was added. The enzyme had a potency of about 320 units/g. as defined in Example 1. To another portion 0.34 gm. of a malt amylase was added per 100 gms. of starch on a dry substance basis. To the third portion 1.53 ml. of concentrated hydrochloric acid per 100 gms. of starch on a dry substance basis was added. After two hours at 49° C. the starch solution containing the hydrochloric acid was neutralized with 5 N potassium hydroxide. The last portion was untreated and served as a control. Viscosities were determined for each of the starch solutions prior to separation of the solid fraction.

The solid starch fractions enriched in amylose were separated from the starch solution by centrifuging and washed by slurrying in distilled water and again centrifuged. This washing procedure was repeated three times. The amylose fractions were then washed three times with methanol and three times with acetone before drying in a vacuum oven at 50° C.

After the amylose fractions had been isolated and purified, a reduced viscosity was determined for each of the amylose fractions. Reduced viscosity is specific viscosity divided by the concentration of the amylose fraction. The reduced viscosities reported below in Table II were determined on 0.4 gram of the amylose fraction/ 100 ml. in 1 N KOH at 30° C. The specific viscosity was determined by the techniques described in Kerr's Chemistry and Industry of Starch, 2nd edition, pages 675–676 (1950). The reduced viscosity of a linear polymer is empirically related to the polymer's molecular weight. Therefore a reduction in the polymer's reduced viscosity indicates a reduction or lowering of the polymer's molecular weight.

The results obtained are reported in Table II.

TABLE II

| Example: | Viscosity of solution, cps. | Type of treatment | Reduced viscosity of amylose |
|---|---|---|---|
| 2 | 265 | Pullulanase | [1] 1.92 |
| 3 | 240 | Malt amylase | 0.61 |
| 4 | 180 | Hydrochloric acid | 1.18 |
| 5 [2] | 750 | Control | 2.07 |

[1] The decrease in reduced viscosity of the amylose fraction is attributed to the low molecular weight amylose (straight chain polymer) obtained from the action of the pullulanase on the amylopectin.

[2] Example 5 was diluted with water to obtain a viscosity of about 240 centipoises prior to centrifuging.

These examples show by the reduced viscosity measurements that a high molecular weight amylose can be recovered by treating a starch solution with pullulanase without encountering substantial degradation of the amylose fraction. These examples further show that with other thinning agents substantial degradation of the amylose fraction is encountered. This is comparatively shown by the reduced viscosity of the amylose fraction treated with either malt amylose or hydrochloric acid as compared with the amylose fraction treated with pullulanase.

EXAMPLE 6

If Example 1 is repeated on highly viscous, stabilized starch solutions having concentrations of starch ranging from about 7% to 25% solids on a dry substance basis, good separations of high molecular weight amylose can be obtained if the starch solutions are first treated with effective thinning amounts of pullulanase prior to separation. When separations are attempted on highly viscous starch solutions which have not been treated with pullulanase, very poor separations of high molecular weight amylose are obtained.

If the concentration of the starch solution is increased to a concentration as high as 30% d.s., good results are also obtained; however, longer contact times between the enzyme and the starch solution or larger amounts of the enzyme are generally required.

Since many embodiments of this invention can be made and since many changes can be made in the embodiments described, the foregoing is to be interpreted as illustrative only and the invention is defined by the claims appended hereafter.

I claim:

1. A process for production of a solid starch fraction enriched in high molecular weight amylose comprising:
    (A) maintaining a stabilized fluid starch solution in the temperature range below that which will substantially deactivate enzyme exhibiting pullulanase activity, said stabilized fluid starch solution containing between about 2.5% and 40% by weight of a starch containing a substantial amount of high molecular weight amylose, and between 60% and 97.5% by weight water;
    (B) treating said stabilized fluid starch solution in said temperature range with an amount of said enzyme exhibiting pullulanase activity sufficient to reduce the viscosity of said stabilized fluid starch solution to a viscosity which will facilitate the formation and separation of a solid starch fraction enriched in high molecular weight amylose;
    (C) allowing said solid starch fraction enriched in high molecular weight amylose to precipitate;
    (D) separating said solid starch fraction enriched in high molecular weight amylose from the remainder of said stabilized fluid starch solution.

2. The process of claim 1 wherein the amount of enzyme is sufficient to reduce the viscosity below 1500 centipoises.

3. The process of claim 2 wherein said stabilized fluid starch solution comprises between 10% and 20% by weight of a starch containing a substantial amount of high molecular weight amylose, and between 80% and 90% by weight of water.

4. The process of claim 2 wherein the enzyme exhibiting amylo-1,6-glucosidase activity is the enzyme pullulanase.

5. The process of claim 4 wherein said enzyme pullulanase is obtained from the organism *Aerobacter aerogenes*.

6. The process of claim 4 wherein said stable fluid starch solution is maintained at a pH of between 5.0 and 8.0.

7. The process of claim 4 wherein said stable fluid starch solution is maintained at a pH of between 6.5 and 7.5.

8. The process of claim 5 wherein said stabilized fluid starch solution is maintained at a temperature between 20° C. and 70° C.

9. The process of claim 7 wherein said stabilized fluid starch solution is maintained at a temperature between 30° C. and 50° C.

References Cited

UNITED STATES PATENTS 3,067,067   12/1969   Etheridge et al. _____ 127—71

OTHER REFERENCES

Bender et al.: Biochemische Zeitschrift, vol. 334, 79–95 (1961).

Bender et al.: Methods in Enzymology, vol. 8, pp. 555–559.

LIONEL M. SHAPIRO, Primary Examiner

J. L. WINDE, Assistant Examiner

U.S. Cl. X.R.

127—65, 71; 195—2, 7

PO-1050
(5/69)

UNITED STATES PATENT OFFICE
CERTIFICATE OF CORRECTION

Patent No. 3,532,602      Dated October 6, 1970

Inventor(s) Martin Seidman

It is certified that error appears in the above-identified patent and that said Letters Patent are hereby corrected as shown below:

Column 3, line 20, for "stablized" read ---stabilized---. Column 3, line 35, for "molecular amylose" read ---molecular weight amylose.--- Column 4, line 6, for "ot" read ---to---. Column 4, line 65 for "activity at a" read ---activity) at a---. Column 6, line 56 for "this most" read ---this is most---. Column 7, line 14, for "purity of the" read ---purity or the---. Column 7, line 21, for "ganular" read ---granular---. Column 8, line 27, for "startch" read ---starch---. Column 10, line 24, for "amylo-1,6-glucosidase" read ---pullulanase---.

Signed and sealed this 30th day of March 1971.

(SEAL)
Attest:

EDWARD M. FLETCHER, JR.
Attesting Officer

WILLIAM E. SCHUYLER, JR.
Commissioner of Patents